US012605874B2

(12) United States Patent
Kimura et al.

(10) Patent No.: US 12,605,874 B2
(45) Date of Patent: Apr. 21, 2026

(54) METHOD AND APPARATUS OF MANUFACTURING RESIN COMPOSITE MATERIAL

(71) Applicant: THE JAPAN STEEL WORKS, LTD., Tokyo (JP)

(72) Inventors: Koichi Kimura, Tokyo (JP); Takuya Miura, Tokyo (JP); Shota Watanabe, Tokyo (JP); Ayaka Shiosaki, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 119 days.

(21) Appl. No.: 18/566,065

(22) PCT Filed: Jun. 3, 2022

(86) PCT No.: PCT/JP2022/022662
§ 371 (c)(1),
(2) Date: Nov. 30, 2023

(87) PCT Pub. No.: WO2022/259984
PCT Pub. Date: Dec. 15, 2022

(65) Prior Publication Data
US 2024/0246279 A1      Jul. 25, 2024

(30) Foreign Application Priority Data

Jun. 9, 2021    (JP) ................................. 2021-096481

(51) Int. Cl.
B29C 48/76          (2019.01)
B29B 7/72           (2006.01)
(Continued)

(52) U.S. Cl.
CPC ............ *B29C 48/766* (2019.02); *B29B 7/726* (2013.01); *B29B 7/845* (2013.01); *B29C 48/92* (2019.02); *B29C 2948/92704* (2019.02)

(58) Field of Classification Search
CPC ....... B29C 48/766; B29C 48/92; B29C 48/05; B29C 48/405; B29C 48/022;
(Continued)

(56) References Cited

U.S. PATENT DOCUMENTS 8,721,312 B2 *   5/2014   Sawa ...................... B29B 7/606
                                                       425/207
8,835,539 B2 *   9/2014   Matsushita ............. B29B 7/489
                                                       524/34
(Continued)

FOREIGN PATENT DOCUMENTS

CN          111361126 A       7/2020
EP          2617545 A1        7/2013
(Continued)

OTHER PUBLICATIONS

Office Action issued Jul. 9, 2024, in Japanese Patent Application No. 2021-096481.
(Continued)

*Primary Examiner* — Seyed Masoud Malekzadeh
(74) *Attorney, Agent, or Firm* — Potomac Law Group, PLLC

(57)          ABSTRACT

An apparatus and a method of manufacturing a resin composite material that are capable of stabilizing a raw-material supply amount and improving manufacturing efficiency of the resin composite material are provided. The apparatus 10 of manufacturing the resin composite material includes: a raw-material supply portion 11 supplying a thermoplastic resin and moisture-absorbent filler; a first cylinder 12; a first degassing portion 13 provided in the first cylinder 12; a die
(Continued)

--- ► FLOW OF GAS ORIGINATING FROM KNEADED MATERIAL
——► FLOW OF KNEADED MATERIAL PUSHED BACK INTO EXTRUDER BY SCREW OF GAS SUCTION/DEGASSING APPARATUS 14 for extrusion molding; and a rotary drive mechanism 15 driving a first screw, and is capable of removing volatile gas generated from a kneaded material of raw materials from inside of the first cylinder 12 to outside by using the first degassing portion 13.

8 Claims, 8 Drawing Sheets

(51) Int. Cl.
  B29B 7/84     (2006.01)
  B29C 48/92    (2019.01)
(58) Field of Classification Search
  CPC ................ B29C 48/297; B29C 48/767; B29C 2948/9259; B29C 2948/926; B29B 7/90
  See application file for complete search history.

(56)              References Cited

U.S. PATENT DOCUMENTS

| | | | | |
|---|---|---|---|---|
| 9,169,397 | B2 * | 10/2015 | Matsushita | ........... B29C 48/914 |
| 9,688,003 | B2 | 6/2017 | Stirner | |
| 2002/0185771 | A1 | 12/2002 | Tojyo | |
| 2012/0329917 | A1 * | 12/2012 | Matsushita | ............. B29C 48/40 |
| | | | | 524/34 |
| 2012/0329918 | A1 * | 12/2012 | Matsushita | ............... C08L 1/02 |
| | | | | 524/34 |
| 2013/0078329 | A1 * | 3/2013 | Sawa | ...................... B29C 48/92 |
| | | | | 425/376.1 |

FOREIGN PATENT DOCUMENTS

| | | |
|---|---|---|
| JP | S60-179407 U | 11/1985 |
| JP | 2001-129870 A | 5/2001 |
| JP | 2001-205627 A | 7/2001 |
| JP | 2002-103424 A | 4/2002 |
| JP | 2002-326219 A | 11/2002 |
| JP | 2020-128032 A | 8/2020 |
| WO | 2017/179584 A1 | 10/2017 |

OTHER PUBLICATIONS

International Search Report for International Patent Application No. PCT/JP2022/022662, Aug. 16, 2022.
Extended European Search Report and European Search Opinion issued May 6, 2025, in European Patent Application No. 22820165.3.
Office Action issued Oct. 23, 2025, in Taiwanese Patent Application No. 111120907.

* cited by examiner

VACUUM SUCTION          VACUUM SUCTION

VACUUM SUCTION          VACUUM SUCTION

- - - ▶ FLOW OF GAS ORIGINATING FROM KNEADED MATERIAL

—————▶ FLOW OF KNEADED MATERIAL PUSHED BACK INTO EXTRUDER BY SCREW OF GAS SUCTION/DEGASSING APPARATUS

METHOD AND APPARATUS OF MANUFACTURING RESIN COMPOSITE MATERIAL

TECHNICAL FIELD

The present invention relates to a method and an apparatus of manufacturing a resin composite material, and particularly to a method and an apparatus of manufacturing a moisture-absorbent filler/thermoplastic resin composite material by extrusion molding.

BACKGROUND ART

People's attention has been attracted to biomass materials as industrial resources. The biomass materials mean materials originating from living organisms such as plants. The biomass materials are organic, and therefore, emit carbon dioxide when being burned. However, the carbon contained in the biomass materials originates from the carbon dioxide absorbed from the atmosphere through photosynthesis during the growth process of the biomass. Therefore, it is considerable that even the use of the biomass material does not increase an amount of the carbon dioxide in the atmosphere as a whole. This property is called carbon neutral.

Against the background of global environmental problems such as global warming problem, there is an urgent need to promote resource saving, material recycling that aims to convert waste into raw materials, and environmental recycling cycle as typified by biodegradable plastics. Also in Japan, the revised Recycling Law, the Law on Promoting Green Purchasing and others have been enacted, and there is a growing need for products that comply with these laws.

Under these circumstances, blending of the biomass material into a resin molded product used in a wide range from automotive parts materials to daily necessities promotes the practice of philosophy of the carbon neutral.

When such a biomass material is used as a filler, this usage forms a pelletized resin composite material by using an extruder often used for molding a thermoplastic resin composite (see, for example, Patent Document 1).

RELATED ART DOCUMENT

Patent Document

Patent Document 1: Japanese Patent Application Laid-open Publication No. 2020-128032

SUMMARY OF THE INVENTION

Problems to be Solved by the Invention

Incidentally, when the resin composite material in which the biomass material is blended as the filler is manufactured by using the extruder, the filler may adhere to a shooter of a raw-material supply portion or form a lump at a feed port of the raw-material supply portion to make the raw material supply amount instable. By the instable raw material supply amount if this happens, a manufacturing amount (extrusion amount) of the resin composite material per unit time is decreased, and efficient manufacturing is not achieved.

For this reason, it is desirable to provide a method and an apparatus of manufacturing the resin composite material capable of stabilizing the raw material supply amount to improve the manufacturing efficiency of the resin composite material.

Means for Solving the Problems

In the method of manufacturing the resin composite material disclosed in this application, in the extrusion molding using the resin composite material containing the moisture-absorbent filler, when the thermoplastic resin and the moisture-absorbent filler are kneaded to form a kneaded material, a volatile gas generated from the kneaded material is degassed from a first cylinder to outside.

In the apparatus of manufacturing the resin composite material disclosed in this application, the first cylinder includes a first degassing portion that degasses the volatile gas generated from the kneaded material to outside.

Effects of the Invention

According to the method and the apparatus of manufacturing the resin composite material disclosed in this application, the resin composite material containing the thermoplastic resin and the moisture-absorbent filler can be efficiently manufactured. In particular, the raw material supply amount can be stabilized, and the extrusion amount can be increased.

BRIEF DESCRIPTIONS OF THE DRAWINGS

DETAILED DESCRIPTION OF PREFERRED EMBODIMENTS

Hereinafter, embodiments will be described in detail with reference to the examples and accompanying drawings. Note that components having the same function are denoted by the same reference signs throughout all the drawings for describing the embodiments, and the repetitive description thereof will be omitted.

First Embodiment

<Apparatus of Manufacturing Resin Composite Material>

Figure 1:
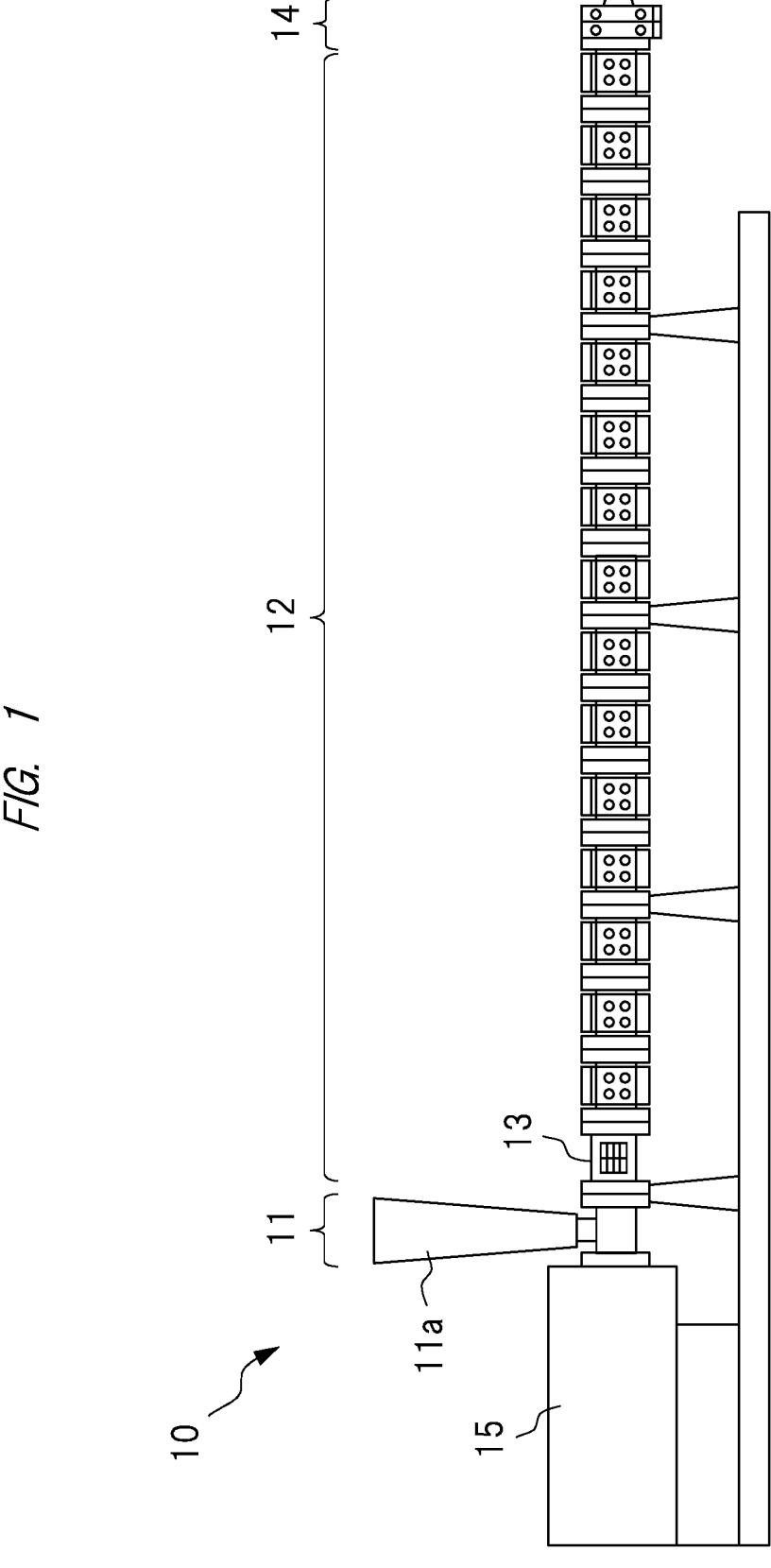
FIG. 1 is a side view showing a schematic configuration of an apparatus of manufacturing a resin composite material according to a first embodiment.
Figure 2:
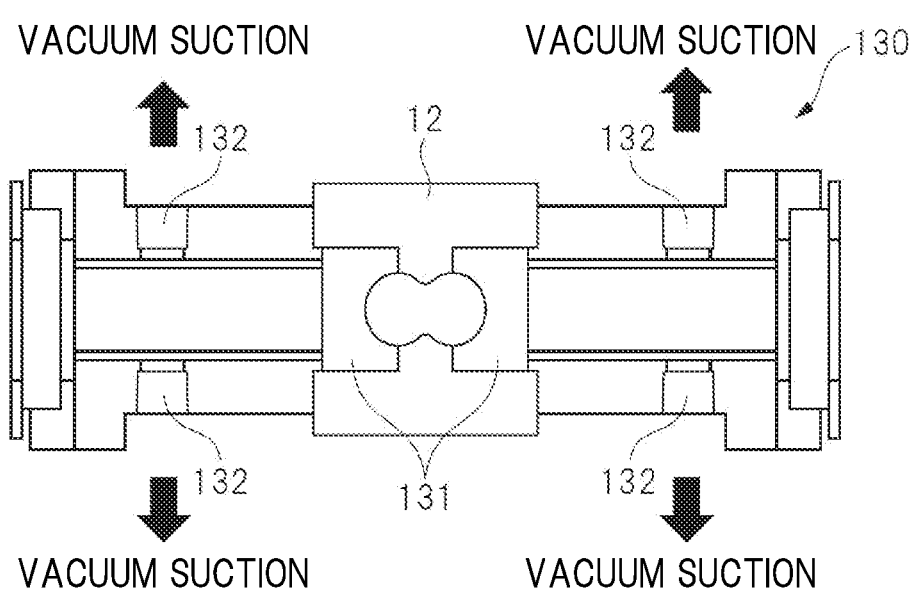
FIG. 2 is a schematic diagram showing a configuration of a degassing cylinder capable of gas suction/degassing as a configuration example of a degassing portion in FIG. 1.

FIG. 1 is a diagram showing a configuration example of an apparatus of manufacturing a resin composite material according to the present embodiment. FIG. 2 is a schematic diagram showing a configuration of a degassing cylinder capable of gas suction/degassing as a volatile-gas degassing portion (first degassing portion) shown in FIG. 1.

An apparatus 10 of manufacturing a resin composite material shown in FIG. 1 is an extruder suitable for manufacturing the resin composite material containing the moisture-absorbent filler and the thermoplastic resin, and is primarily used to manufacture a pellet as raw materials, as a pre-processing apparatus of manufacturing a molded product made of the resin composite material.

The apparatus 10 of manufacturing the resin composite material includes: a raw-material supply portion 11; a cylinder 12 including a screw; a degassing portion 13 for volatile gas located upstream of the cylinder 12; a die 14; and a rotary drive mechanism 15 driving the screw of the cylinder 12.

The raw-material supply portion 11 supplies the raw materials of the resin composite material to the cylinder 12. In the present embodiment, the thermoplastic resin and the moisture-absorbent filler are fed as the raw materials from the top to a shooter 11a of the raw-material supply portion 11 by, for example, a feeder or the like, and these raw materials are mixed and supplied to the cylinder 12. The raw materials used here will be explained in detail later.

The cylinder 12 includes the screw therein. By rotating this screw, the kneaded material obtained by kneading the raw materials is conveyed through the cylinder 12. A twin-screw extruder can be configured by using a twin screw provided with two screws for this screw. The twin-screw extruder has the flexibility to freely change operating conditions such as a screw rotation speed and a barrel setting temperature, and also has various advantages such as high kneadability and continuous productivity.

The cylinder 12 is made of, for example, a plurality of joint cylinder blocks, each including a space therein into which the kneaded material of the thermoplastic resins and the moisture-absorbent filler can be conveyed. A screw is provided in this space, and the screw is connected to the rotary drive mechanism 15. The screw can be rotated by the rotary drive mechanism 15 to convey the kneaded material in the cylinder 12.

Also, the cylinder 12 is equipped with a heater (not illustrated) so that its temperature can be adjusted. By this heater, the thermoplastic resin which is the raw material is melted, and the kneaded material of the thermoplastic resin and the moisture-absorbent filler is easily obtained. The kneaded material obtained as described above can easily be conveyed through the cylinder 12. At this time, it is preferable to control the temperature of the kneaded material so as to prevent excessive increase of the temperature.

The degassing portion 13 for the volatile gas primarily has a function of removing the volatile gas generated from the resin composite material to the outside of the cylinder 12, and is located, for example, upstream of the cylinder 12. It is sufficient that the degassing portion 13 for volatile gas has an opening (degassing port) on a side or top surface of the cylinder 12, and the volatile gas generated in the cylinder 12 can be removed to the outside because of such an opening.

Furthermore, in order to efficiently remove the volatile gas, a degassing apparatus capable of depressurizing gas suction may be used as the degassing portion 13. Because of such a degassing apparatus, the volatile gas generated in the cylinder 12 can be removed more efficiently.

The upstream side of the cylinder 12 means an upstream side of a flow direction of the kneaded material in which the raw material is kneaded and conveyed through the cylinder 12 (closer to the raw-material supply portion 11). Also, the upstream side in the present embodiment means a region of the cylinder 12 from the raw-material supply portion 11 to a position at which the thermoplastic resin is melted and plasticized. A position provided with the degassing portion 13 is preferably within 70% of the total screw length from the raw-material supply portion 11, and more preferably within 40% of the total screw length from the raw-material supply portion 11, and is particularly preferably at the connection part of the cylinder 12 with the raw-material supply portion 11 (immediately after the raw-material supply portion 11). The number of degassing portions 13 to be installed is not limited to one in particular.

Note that the position at which the thermoplastic resin is melted and plasticized means a region where a cylinder temperature is a melting start temperature or higher in a case of a crystalline resin or is a glass transition temperature or higher in a case of a noncrystalline resin, and more preferably a region where the cylinder temperature is a melting temperature (melting point) or higher in the case of the crystalline resin or is the glass transition temperature or higher in the case of the noncrystalline resin. Here, the melting start temperature/melting temperature (melting point) of the crystalline resin can be determined by, for example, a differential scanning calorimeter (DSC, PerkinElmer DSC8500). In a DSC curve, a temperature corresponding to a point at which a baseline before a peak due to the melting of the crystalline resin comes in contact with a tangent line of a left inflection point of the melting peak is the melting start point, and a temperature indicating the melting peak is the melting point.

The die 14 is a member for extruding and shaping the kneaded material conveyed through the cylinder 12, and has a hole for extrusion molding. By a shape of the hole provided in the die 14, the shape to be formed is determined. In this case, various shapes of the hole are applicable depending on the shape of the resin composite material to be manufactured, and a suitable shape may be selected. For example, in a case of molding a strand shape, a plurality of circular holes are provided. In a case of molding a sheet shape, slit-shaped holes are provided.

The rotary drive mechanism 15 is an apparatus for rotating the screw provided inside the cylinder 12. The screw rotated by the rotary drive mechanism 15 conveys the raw materials through the cylinder 12.

Note that a degassing cylinder used when two screws are provided in the cylinder 12 is exemplified as the degassing cylinder 130 in FIG. 2. However, the extruder according to the present embodiment can be a twin-screw extruder with two screws or a single-screw extruder with one screw.

If the apparatus of manufacturing the composite resin material is the twin-screw extruder, the two screws are arranged so that they engage each other, and are rotated. If the number of screws is two, a space volume can be increased. Therefore, if screw bore diameters are the same, the twin-screw extruder with two screws has a higher extrusion amount than that of the single-screw extruder with one screw, and is more preferable. The extending direction of the cylinder 12 is the same as that of the screw inside the cylinder 12.

<Degassing Portion for Volatile Gas>

In the present embodiment, as described above, the degassing portion 13 for volatile gas only needs to have the opening for removing the volatile gas generated in the cylinder 12 to the outside. Also, if the degassing portion 13 is made of the degassing cylinder capable of gas suction/degassing, the degassing portion 13 is preferable because of being capable of efficiently removing the volatile gas.

FIG. 2 shows a configuration example of the degassing cylinder as an example. As part of the cylinder 12, this degassing cylinder 130 is provided at the connection with the raw-material supply portion 11. The degassing cylinder 130 is provided so as to communicate an internal space from the raw-material supply portion 11 to the cylinder 12, and achieves flow of the thermoplastic resin and the moisture-absorbent filler which are the raw materials. A screw is disposed in the communicating space. The degassing cylinder 130 is provided with a degassing port for discharging the volatile gas generated inside the cylinder 12 to the outside.

The degassing cylinder 130 described here is exemplified in a case in which the degassing cylinder is provided with a screen 131 not allowing the supplied solids (raw materials) but allowing the volatile gas to pass through, as a degassing port. By such a screen 131, the volatile gas to be removed can be removed from the cylinder 12 to the outside without leakage of the raw materials to the outside.

Furthermore, in the degassing cylinder 130, it is preferable that a suction port 132 provided in the degassing cylinder 130 is connected to a suction apparatus such as a vacuum pump so that the volatile gas can be efficiently degassed from the degassing port (screen 131). In FIG. 2, a case with four suction ports 132 is exemplified.

In the embodiment above, note that the case with one degassing portion 13 has been described as an example. However, two or more degassing portions may be provided. Even in the case with two or more degassing portions, all the setting positions are on the upstream side in the cylinder 12.
<Raw Materials for Resin Composite Material>

Next, the raw materials used in a method of manufacturing the resin composite material in the present embodiment will be described. The raw materials used here include the thermoplastic resin and the moisture-absorbent filler.

As the thermoplastic resin, any resin that can be plasticized and molded by heat can be used. As the thermoplastic resin, for example, polyethylene, polypropylene, polyamide, polyethylene terephthalate, polyimide, poly ether ether ketone, and others are exemplified, among which low-density polyethylene or polypropylene easily keeping the temperature of the kneaded material low is preferable in a viewpoint of moldability.

Also, in the present embodiment, a biodegradable resin may also be used as the thermoplastic resin. As the biodegradable resin with thermoplasticity, for example, polylactic acid, polybutylene succinate, polyethylene succinate, polyglycol, polycaprolactone, polyvinyl alcohol and others are exemplified although not limited thereto.

The thermoplastic resin in the present embodiment can be used in any form, but a granular molded form is preferable for ease of handling. Alternatively, it is possible to use two or more types of thermoplastic resins concurrently. Furthermore, at the time of the kneading with the moisture-absorbent filler, a compatibilizing resin (compatibilizer) which is also a thermoplastic resin may be added in order to improve uniformity and adhesion.

As the compatibilizing resin, a publicly-known compatibilizing resin is used, and maleic acid-modified polypropylene (UMEX 1010, manufactured by Sanyo Chemical Industries, Ltd.), Modic (registered trademark) P908 (manufactured by Mitsubishi Chemical Corporation) and others are exemplified although not limited thereto. The compatibilizing resin works to enhance the uniform mixing and the adhesion between the moisture-absorbent filler and the thermoplastic resin. It is unnecessary to use the compatibilizing resin. However, if it is used, the compatibilizing resin of an amount of up to about 15 mass % in the resin composite material obtained by the kneading is used.

As the moisture-absorbent filler used in the present embodiment, any filler that is moisture-absorbent can be used without particular limitation. As the moisture-absorbent filler, fillers made of natural materials or chemical materials are exemplified. Here, cases of the moisture-absorbent fillers include not only a case in which the filler material itself can keep moisture, but also a case in which the filler form can keep the moisture (for example, a case in which the filler is a fiber filler that can keep the moisture between fibers).

As the natural materials, plant materials, animal materials, mineral materials and others are exemplified, and the plant materials or the animal materials are preferable. As the plant materials, cellulose is exemplified, such as: seed hairs such as cotton, kapok, and akund; bast such as linen (flax), ramie, hemp, jute, and kenaf; leaf vein such as Manila hemp (abaca), sisal hemp, and aloe; and seed coat of coconut (palm fruits), banana and others. As the animal materials, animal hair such as angora, cashmere, wool (sheep wool), goat hair, rabbit hair, mohair, camel hair, and alpaca hair; silk such as house silkworm silk (mulberry silk) and wild silkworm silk; feathers such as down cotton, feather cotton, and feather; shells of crabs, ascidians, and others are exemplified. As the mineral materials, natural minerals such as asbestos are exemplified.

As the chemical materials, regenerated cellulose, semi-synthetic or synthetic materials, high performance materials, inorganic materials and others are exemplified. Among the chemical materials, recycled cellulose materials such as viscose rayon, cuprammonium rayon, and purified cellulose, and synthetic materials such as polyester-based materials, polyamide-based materials, and polyvinyl alcohol-based materials are preferable.

The moisture-absorbent filler is generally often a material that is moisture-absorbent, and the natural materials are preferable in the viewpoint of the carbon neutral. As the form of the moisture-absorbent filler, for example, the granular form, the fibrous form and others are exemplified although not particularly limited thereto. Among these materials, the plant fibers (cellulose fibers) and the animal fibers (protein fibers) are preferable.

The state of the moisture-absorbent filler used in the present embodiment is preferably the lump state for ease of feeding the raw material at the time of the kneading with the thermoplastic resins described above. Even in the case of the fibrous materials, these fillers are preferably aggregated in the lump state. At this time, a size of the raw material is preferably equal to or smaller than 50 mm. For a raw material with a larger size, it is sufficient to adjust its size to 50 mm or smaller by grinding as appropriate, and the moisture-absorbent filler with a size that is equal to or larger than 1 mm and equal to or smaller than 50 mm is preferable. In the present embodiment, the size of the moisture-absorbent filler can be screened and selected, based on a hole size of a screening apparatus. The moisture-absorbent filler may be ground by using, for example, a hammer mill.

The moisture-absorbent filler used in the present embodiment may also be used in a molded product form. That is, a ground starting material of the moisture-absorbent filler is molded into a briquette from or a pellet from. The moisture-absorbent filler being the molded product is easily handled and is highly densified, and therefore, reduces transportation costs. A bulk density of the molded product having been densified is preferably equal to or larger than 500 kg/m$^3$, and more preferably equal to or larger than 600 kg/m$^3$. The bulk density can be measured according to JIS K 2151, "6. Bulk density test method".

In the present embodiment, as an apparatus used to make the moisture-absorbent filler into the molded product, for example, a briquetter (manufactured by Kitagawa Corporation), a ring-die pelletizer (manufactured by CPM company), or a flat-die pelletizer (manufactured by Kahl company, manufactured by DALTON company) is desirable although not particularly limited thereto.

In the present embodiment, when the moisture-absorbent filler is made into the molded product, a moisture percentage of the moisture-absorbent filler is preferably 3 to 50%, and further preferably 10 to 30%. If the moisture percentage is lower than 8%, inside of the briquetter or the pelletizer is clogged, and stable manufacturing of the molded product is not possible. If the moisture percentage is higher than 50%, the molding becomes difficult, and the product is discharged in a powder form or a paste form.

In the present embodiment, a binder may be added to the moisture-absorbent filler. As the binder, for example, organic polymers such as starch and lignin, inorganic polymers such as acrylamide, and agricultural residues such as bran (that is a residue generated during flour production) can be suitably used, although not particularly limited thereto. In the viewpoint of efficient and effective use of the moisture-absorbent filler, the smaller addition parts of the binder is desirable, and is preferably equal to or smaller than 50 parts by mass per 100 parts by mass of the moisture-absorbent filler, and more preferably equal to or smaller than 20 parts by mass per it. However, addition of the binder larger than 50 parts by mass does not necessarily mean that the densification is impossible.

In addition, the raw materials may include other components including organic and/or inorganic materials other than the thermoplastic resin and the moisture-absorbent filler. As the other components, for example, alkalies such as sodium hydroxide, potassium hydroxide, magnesium hydroxide, and calcium hydroxide; inorganic fillers such as clay, talc, calcium carbonate, mica, titanium dioxide, and zinc oxide; organic fillers such as carbon black, graphite, and glass flakes; dye or pigment such as red oxide, azo pigments, and phthalocyanine; and additives for modification such as dispersants, lubricants, plasticizers, mold release agents, flame retardants, antioxidants (phenol-based antioxidants, phosphorus antioxidants, sulfur-based antioxidants), anti-static agents, light stabilizers, ultraviolet absorbers, metal deactivators, crystallization promoters (nucleating agents), foaming agents, crosslinkers, and antibacterial agents are exemplified.

In the present embodiment, the moisture-absorbent filler is preferably ground before being kneaded with the thermoplastic resin. An average particle size of the ground material is preferably equal to or smaller than 500 μm, more preferably equal to or smaller than 300 μm, and particularly preferably equal to or smaller than 200 μm. If the average particle size of the ground moisture-absorbent filler is larger than 500 μm, uniform mixing with the resin may become difficult, and the resin body of the kneaded material may be cut into small pieces at an outlet of the apparatus that injects the kneaded material of the ground moisture-absorbent filler and the resin. Such cases may cause problems making it difficult to, for example, convey the molded product obtained by the extrusion to a cooling process apparatus. The "average particle size" described in this specification means a 50% volume-based average particle size (D50) measured by the laser light scattering method (laser diffraction method), and can be measured by a laser diffraction/scattering type particle size distribution analyzer (manufactured by Malvern Instruments Ltd., instrument name: Mastersizer 2000) or the like.

As a grinder machine used in the grinding of the moisture-absorbent filler, for example, any apparatus capable of grinding the organic materials is sufficient, such as ball mill, rod mill, bead mill, conical mill, disk mill, edge mill, hammer mill, mortar, pellet mill, VSI mill, Wiley mill, roller mill, jet mill, mass-colloider and others, although not limited to. Alternatively, as the grinding machine, a twin-screw kneading extruder (TEX series such as TEX30, manufactured by The Japan Steel Works, Ltd.) or others may also be used.

As described below, the resin composite material according to the present embodiment is obtained by heating and kneading the above moisture-absorbent filler with the thermoplastic resin, and then, extruding and molding them. In order to achieve the carbon neutral at a high level, it is preferable to use the natural fibers as the moisture-absorbent filler in the resin composite material, and to make a higher mixing ratio of the natural fibers. However, in consideration of the manufacturing and strength of the resultant resin composite material and molded product, the mixing ratio is preferably equal to or higher than 10 mass % and equal to or lower than 90 mass %, and more preferably equal to or higher than 30 mass % and equal to or lower than 80 mass %.

<Method of manufacturing Resin Composite Material>

Next, each process of the method of manufacturing the resin composite material according to the present embodiment will be described while taking the case of the use of the apparatus 10 of manufacturing the resin composite material in FIG. 1 described above as an example.

First, the raw materials of the resin composite material prepared as described above are supplied from the raw-material supply portion 11 to the cylinder 12 [(1a) Raw-material supply step]. The thermoplastic resin and the moisture-absorbent filler which are the raw materials are separately fed from the top into, for example, the shooter of the raw-material supply portion 11 by a feeder or the like. The fed materials are mixed and supplied to the cylinder 12.

The raw materials supplied to the cylinder 12 are heated by a heater provided outside the cylinder 12 or by heat generated when the raw materials are sheared, and the thermoplastic resin is melted and plasticized [(1b) Kneading step]. The melted and plasticized thermoplastic resin and the moisture-absorbent filler are kneaded by the screw provided in the cylinder 12, and form a mixture of the thermoplastic resin and the moisture-absorbent filler.

A temperature in the kneading (processes such as heating, melting, and kneading) in the present embodiment is generally about 100 to 300° C., preferably about 100 to 250° C., and particularly preferably about 100 to 200° C.

In the method of manufacturing the resin composite material according to the present embodiment, for example, a general extruder is used to heat and knead the moisture-absorbent filler and the thermoplastic resin. A twin-screw extruder is preferable as the extruder, and the twin-screw extruder can be used for both the step of grinding the moisture-absorbent filler and the step of heating and kneading the ground moisture-absorbent filler and the thermoplastic resin. Accordingly, it is possible to continuously manufacture the resin composite material by linking twin-screw kneading extruders or a single apparatus continuously performing these two steps.

Then, by the screw, the resultant kneaded material is conveyed through the cylinder 12 to its downstream side (close to the die 14 side) [(1*c*) Conveying step]. During the conveyance, the thermoplastic resin and the moisture-absorbent filler are sufficiently kneaded to form a uniform kneaded material. If the material is not sufficiently kneaded, the kneaded material may not be formed into the desired shape or the desired properties may not be obtained at the following extruding step.

In the (1*c*) conveying step, the temperature in the cylinder 12 is maintained so that the kneaded material smoothly flow. That is, a temperature heated in the (1*b*) kneading step described above or a temperature capable of flowing the kneaded material may be maintained. The kneaded material that has moved to downstream of the cylinder 12 in the conveying step is finally extruded from the die 14 so as to be formed into the desired shape [(1*d*) extruding step], and is further solidified by cooling to become the resin composite material.

As a form of the resultant resin composite material in this step, a strand-like form, a sheet-like form and others are exemplified, although not particularly limited thereto. The strand- or sheet-form resin composite material is cut to the desired size, and is used as a material for the product molding.

(Degassing of Volatile Gas)

In the (1*b*) kneading step described above, the volatile gas generated from the kneaded material obtained by kneading the thermoplastic resins and the moisture-absorbent filler is degassed to the outside from the degassing portion 13 provided on upstream side of the cylinder 12. Here, the degassing portion 13 is provided on the upstream side of the cylinder 12 as described above. That is, a position for providing the degassing portion 13 for the volatile gas is between the connection portion with the raw-material supply portion 11 and a position where the thermoplastic resin is melted and plasticized, is preferably within 70% of the total screw length from the raw-material supply portion 11, more preferably within 40% of the total screw length from the raw-material supply portion 11, and more preferably the connection portion of the cylinder 12 with the raw-material supply portion 11 (just after the raw-material supply portion 11).

If the degassing portion 13 is made of a degassing cylinder capable of the gas suction/degassing, the volatile gas can be preferably efficiently removed.

By providing the degassing portion 13 as described above, the volatile gas generated from the kneaded material can be efficiently degassed. By this degassing, the conveyance and the extrusion molding in the state of the mixture of the volatile gas with the kneaded material can be suppressed. In addition, at the time of the supply of the raw materials, the raw materials can be stably supplied even if the supply amount of the raw materials is large.

(Background of Study)

The present inventors have studied the manufacturing of the resin composite material under the extrusion molding using the thermoplastic resin and woody biomass or the like as a material that can achieve the carbon neutrality.

Incidentally, when the resin composite material is tried to be manufactured by the extruder while using the material that can achieve the carbon neutrality as the filler, a case of making the raw material supply amount unstable has been observed depending on the material of the filler since the filler adheres to the shooter of the raw-material supply portion or forms the lump at the feed port of the raw-material supply portion. If the raw material supply amount is unstable, the manufacturing amount (extrusion amount) of the resin composite material per unit time decreases, and the efficient manufacturing is not achieved.

In order to find a cause of the unstable raw material supply amount, the present inventors have studied how an amount of gas generated from the used filler changes in relation to the heating temperature, by using a thermogravimetric analysis method. Specifically, by using a thermogravimetric analyzer (TG-DTA), they have studied the mass change (mass loss rate) of cellulose powder (manufactured by Nippon Paper Industries, Co., Ltd., KC FLOCK W50GK; average particle size of 45 μm) used as the filler when being heated at a temperature increase rate of 20° C./min.

As a result, it has been found that the above-described filler exhibits a mass loss of about 5% at about 100° C. when being heated. It is thought that this mass loss occurs mainly because water contained in the filler vaporizes to becomes water vapor, which is then released out. In this regard, in the step (1*b*) described above, the thermoplastic resin is heated to the temperature at which it is melted and plasticized, and therefore, the filler kneaded with the thermoplastic resin is also heated to generate the volatile gas (water vapor) if the water is contained in the filler at this time. It is considerable that the generated water vapor flows into the raw-material supply portion 11, and becomes the cause of the adhesion of the filler to the shooter or the formation of the lump at the feed port of the raw-material supply portion 11, and the instability of the raw-material supply amount is caused by such phenomena.

Accordingly, the present inventors have found that the above-described problem can be solved to make the raw-material supply amount stable by releasing the water vapor to the outside immediately after being generated from the cylinder 12. And, they also have found that this stabilization of the raw-material supply amount can increase the extrusion amount of the kneaded materials and improve the manufacturing efficiency of the resin composite material. In addition, because of the above-described background, in the present embodiment focusing on not the carbon neutrality that has been taken into consideration but the stabilization of the raw-material supply amount and the improvement of the manufacturing efficiency of the resin composite material, it has been also found that any moisture-absorbent filler that can contain water can be widely applied.

In addition, note that it is also considerable that further heating to a higher temperature causes a risk of generation of gas due to the decomposition of the moisture-absorbent filler itself (gas component originating from the kneaded material). In this case, a large mass loss is expected. A remedy for this point will be described later.

Second Embodiment

<Apparatus of Manufacturing Resin Composite Material>

The second embodiment is an embodiment in which the thermoplastic resin and the moisture-absorbent filler are the raw materials are supplied at different positions, and other configurations can be the same as those of the first embodiment.

Figure 3A:
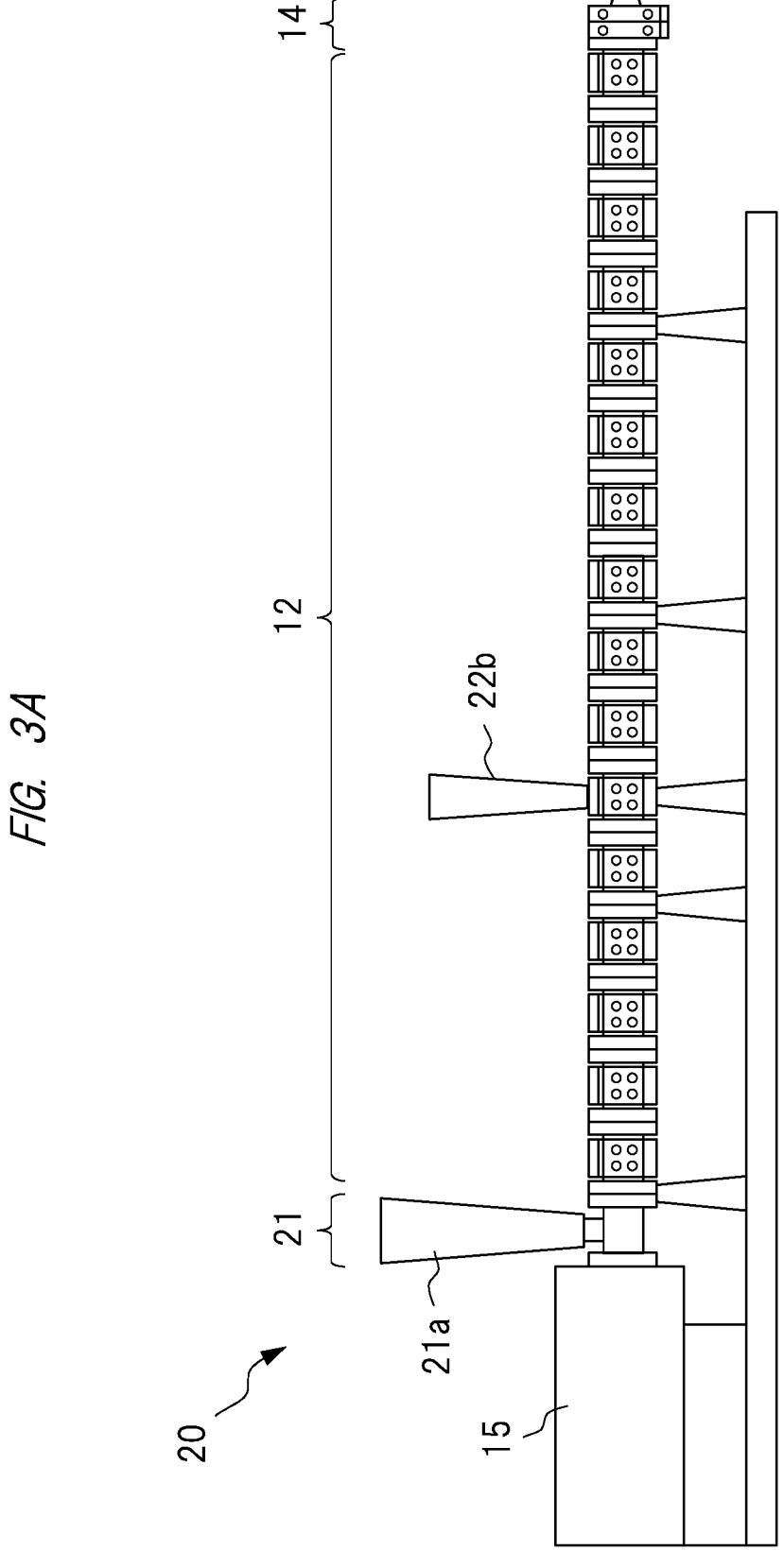
FIG. 3A is a side view showing a configuration of an apparatus of manufacturing a resin composite material according to a second embodiment.
Figure 3B:
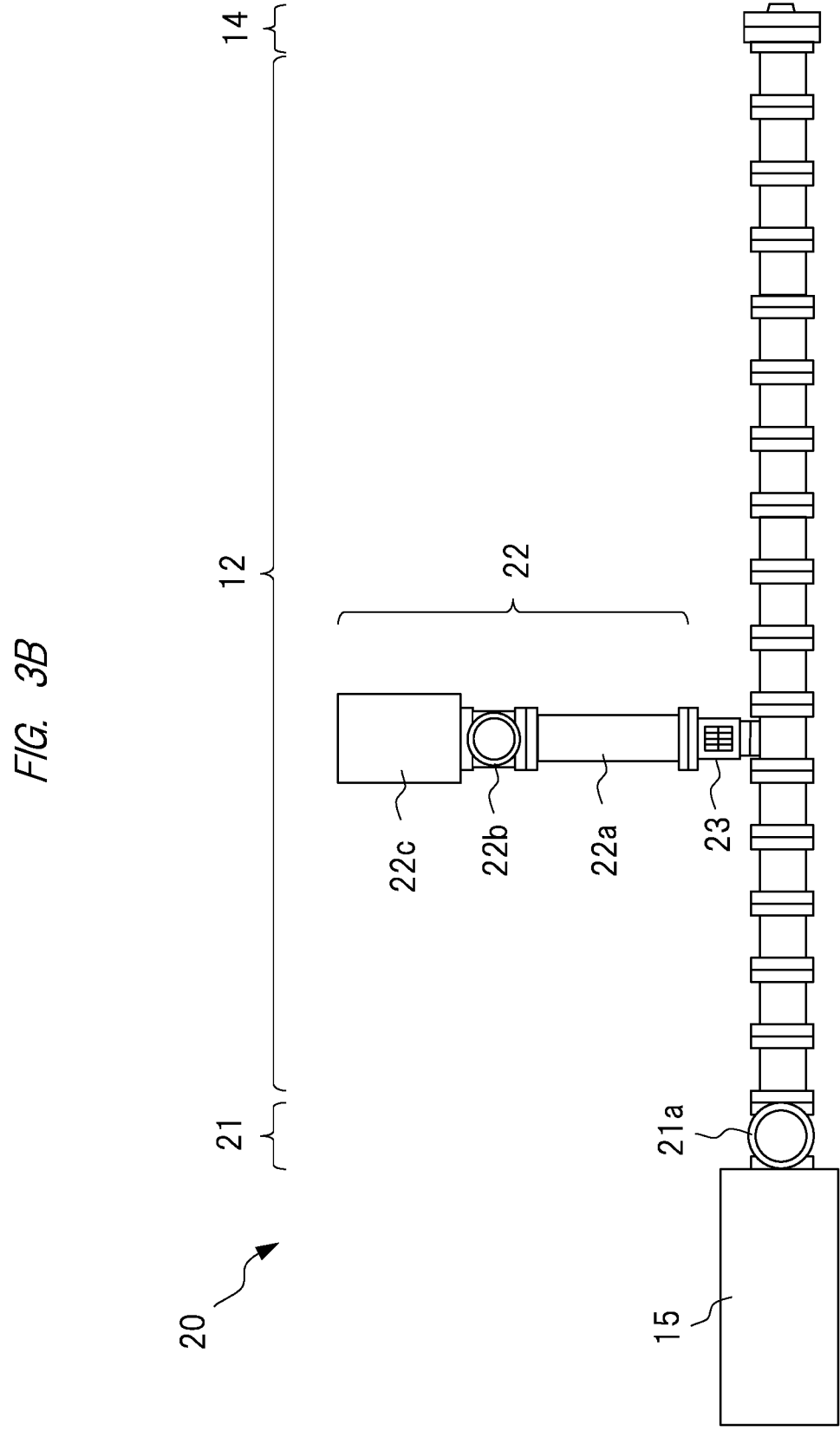
FIG. 3B is a top view showing the configuration of the apparatus of manufacturing the resin composite material in FIG. 3A.

For example, as shown in FIG. 3A and FIG. 3B, an apparatus 20 of manufacturing the resin composite material according to the second embodiment includes a resin supply portion 21, a cylinder 12, a moisture-absorbent filler supply portion 22, a volatile-gas degassing portion 23, a die 14, and a rotation drive mechanism 15. The different parts from the first embodiment will be mainly described below.

In the apparatus 20 of manufacturing the resin composite material, the resin supply portion 21 and the moisture-absorbent filler supply portion 22 are provided at different positions from each other so that the thermoplastic resin is first supplied from the resin supply portion 21 and is heated to be melted and plasticized, while the moisture-absorbent filler is then supplied to the melted and plasticized thermoplastic resin.

Here, the resin supply portion 21 is provided at the same position as that of the raw-material supply portion 11 of the first embodiment, and its configuration is also the same as that of the raw-material supply portion 11. The resin supply portion 21 differs from the raw-material supply portion 11 in that the thermoplastic resin is supplied as the raw material while no moisture-absorbent filler is supplied.

The moisture-absorbent filler supply portion 22 is provided to be closer to the downstream side of the cylinder 12 than the resin supply portion 21 so that the previously supplied thermoplastic resin is heated to be melted and plasticized while the moisture-absorbent filler is supplied into and mixed with the melted and plasticized thermoplastic resin.

The moisture-absorbent filler supply portion 22 only needs to supply the moisture-absorbent filler into the cylinder 12, and, for example, a screw-type supply apparatus (side feeder) connected to an opening provided on a side surface of the cylinder 12 can be used.

As shown in FIG. 3A and FIG. 3B, the moisture-absorbent filler supply portion 22 is connected to the middle of the cylinder 12 (on the back side of the cylinder 12 in FIG. 3A (in a direction orthogonal to an extending direction of the cylinder 12, the direction being on the same horizontal plane as that of the cylinder 12)). Note that the cylinder 12 is basically the same as that of the first embodiment, but is different therefrom in exclusion of the degassing portion 13.

To the moisture-absorbent filler supply portion 22, a screw-type feeder (for example, a side feeder) is applicable. In this case, in the moisture-absorbent filler supply portion 22, it is sufficient that a cylinder 22a having a screw is connected to the side surface of the cylinder 12 so that the moisture-absorbent filler can be added in the middle to the melted and plasticized resin while being conveyed through the cylinder 12. The cylinder 22a includes a shooter 22b for feeding the moisture-absorbent filler, and the moisture-absorbent filler fed through the shooter 22b is conveyed through the cylinder 22a by a screw connected to a rotary drive mechanism 22c. The moisture-absorbent filler is conveyed toward the cylinder 12, and is added to and mixed with the melted and plasticized thermoplastic resin in the cylinder 12 at the connection portion between the cylinder 12 and cylinder 22a.

Further, in the present embodiment, a degassing portion 23 for volatile gas is provided between the cylinder 12 and the moisture-absorbent filler supply portion 22 so as to mainly remove the volatile gas from the cylinder 12 to the outside, the volatile gas being generated when the moisture-absorbent filler is added to the melted and plasticized thermoplastic resin.

In order to efficiently further remove the volatile gas, a degassing apparatus capable of depressurizing gas suction may be used as the degassing portion 23. By such a degassing apparatus, the volatile gas generated in the cylinder 12 can be removed more efficiently. As the degassing apparatus capable of depressurizing gas suction, the same degassing apparatus described in the first embodiment can be used.

<Method of Manufacturing Resin Composite Material>

Next, each step of the method of manufacturing the resin composite material in the present embodiment will be described while taking the case of using the apparatus 20 of manufacturing the resin composite material in FIG. 3A and FIG. 3B described above as an example.

First, the raw materials of the resin composite material prepared as described above are supplied from the resin supply portion 21 to the cylinder 12 [(2a) Resin supplying step]. The thermoplastic resin which is the raw material is fed into, for example, the shooter 21a of the resin supply portion 21 from the top by a feeder or the like, and the fed raw material is supplied to the cylinder 12.

The thermoplastic resin supplied to the cylinder 12 is heated by a heater provided outside the cylinder 12, by heat generated when the raw materials are sheared, or by others, and is melted and plasticized [(2b) Melting/Plasticizing step].

Next, the moisture-absorbent filler is fed from the moisture-absorbent filler supply portion 22 into the cylinder 12, the moisture-absorbent filler is added to the melted and plasticized resin, these materials are kneaded by the screw provided in the cylinder 12 to provide the kneaded material of the thermoplastic resin and the moisture-absorbent filler [(2c) Kneading step].

The resultant kneaded material is conveyed by the screw through the cylinder 12 to its downstream side (close to the die 14) [(2d) Conveying step]. During this conveyance, the thermoplastic resin and the moisture-absorbent filler are sufficiently kneaded to form the uniform mixture. If the thermoplastic resin and the moisture-absorbent filler are not sufficiently kneaded, the molded product with desired properties may not be obtained at the following extruding step.

In the conveying process, the kneaded material that has moved downstream side of the cylinder 12 is finally extruded from the die 14 so as to form a desired shape [(2e) Extruding step], and is solidified when being further cooled to become the resin composite material.

The second embodiment provides the same configuration as that of the first embodiment, except that the positions of supplying the thermoplastic resin and the water-absorbing filler differ. That is, in the second embodiment, the thermoplastic resin is first supplied to the cylinder 12, is heated, is melted and plasticized, and then, the moisture-absorbent filler is added and kneaded with the thermoplastic resin.

Since the raw material supply positions are divided as described above, the position at which the degassing portion 23 in the second embodiment is arranged changes to the connection portion of the moisture-absorbent filler supply portion 22 with the cylinder 12.

In the second embodiment, in the mixture of the moisture-absorbent filler with the melted and plasticized thermoplastic resin, the volatile gas is generated from the moisture-absorbent filler immediately after the mixture. In this case, the generated volatile gas can immediately be removed from the cylinder 12 to the outside because the degassing portion 23 is arranged upstream of the mixing position. In this manner, the problems caused by the generation of water vapor can be solved.

That is, as similar to the first embodiment, the stabilization of the raw material supply amount can be achieved. This can increase the extrusion amount of the kneaded material, and improve the manufacturing efficiency of the resin composite material.

Third Embodiment

<Apparatus of Manufacturing Resin Composite Material>

The third embodiment is an embodiment with a degassing portion different from the degassing portion 13 that can release the gas component originating from the kneaded material generated during the conveyance of the kneaded material through the cylinder 12 from the cylinder 12 to the outside, and the other configurations can be the same as those of the first embodiment.

Figure 4:
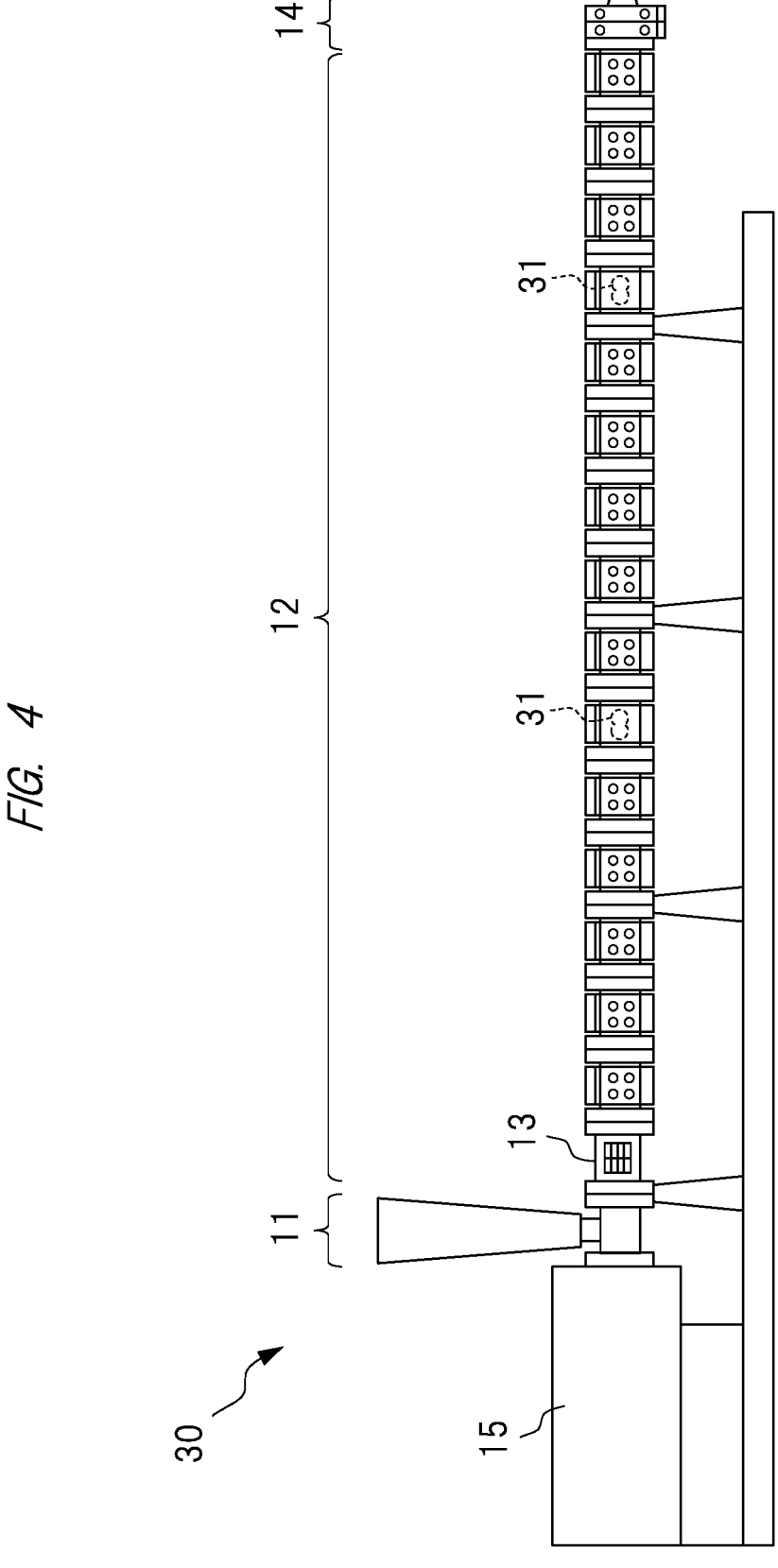
FIG. 4 is a side view showing a schematic configuration of an apparatus of manufacturing a resin composite material according to a third embodiment.

For example, as shown in FIG. 4, an apparatus 30 of manufacturing the resin composite material according to the third embodiment includes the raw-material supply portion 11, the cylinder 12, the degassing portion 13, the die 14, the rotary drive mechanism 15, and a degassing portion 31. Different parts from those of the first embodiment will be mainly described.

The apparatus 30 of manufacturing the resin composite material according to the third embodiment includes all the components of the apparatus 10 of manufacturing the resin composite material according to the first embodiment, and further includes the degassing portion 31 connected to the cylinder 12.

It is sufficient that the degassing portion 31 mainly includes an opening through which the gas component originating from the kneaded material can be removed from the cylinder 12 to the outside, and FIG. 4 shows an example of a configuration with an apparatus for forcibly performing the gas suction/degassing as the degassing portion 31. As similar to the moisture-absorbent filler supply portion 22 in the second embodiment, this gas suction/degassing apparatus is connected to the middle of the cylinder 12 (in FIG. 4, in a direction orthogonal to an extending direction of the cylinder 12, the direction being on the same horizontal plane as that of the cylinder 12)).

Figure 5:
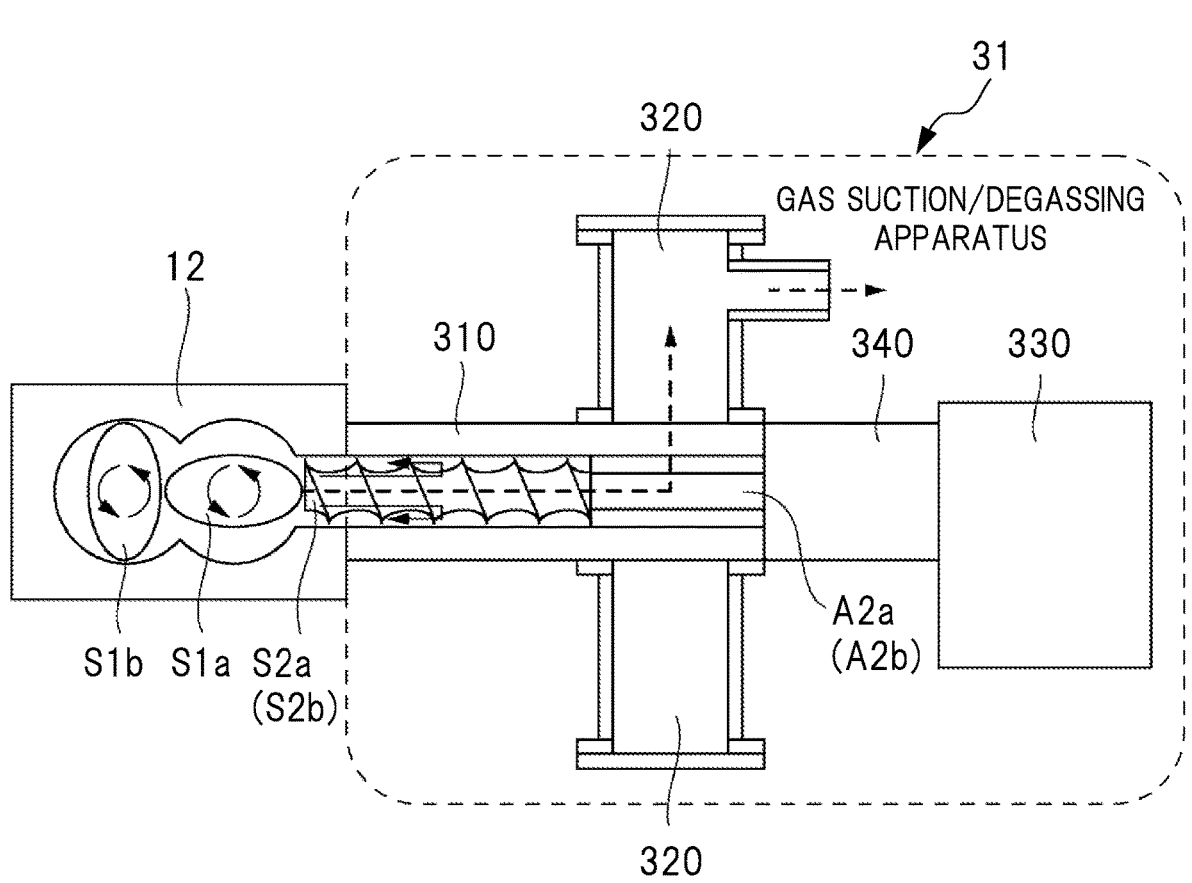
FIG. 5 is a diagram showing a schematic configuration of a gas suction/degassing apparatus as a configuration example of a degassing portion in FIG. 4.

Also, FIG. 5 shows an example of a configuration of the gas suction/degassing apparatus. FIG. 5 is a schematic diagram of the connection structure between the cylinder 12 and the gas suction/degassing apparatus as viewed from the die 14 side. The gas suction/degassing apparatus includes a cylinder 310, two screws S2*a* and S2*b* provided inside the cylinder 310, a vent portion 320 that communicates with a space inside the cylinder 310 to provide a depressurization state, and a rotary drive mechanism 330 connected to the screws S2*a* and S2*b*. The vent portion 320 can provide the depressurization state when, for example, being connected to a vacuum pump, and a shaft sealing portion 340 is provided between the screws S2*a* and S2*b* and the rotary drive mechanism 330. The configuration near the cylinder 310 of the gas suction/degassing apparatus is similar to the configuration of the cylinder 12. However, a diameter of the screw and a diameter of the cylinder can be designed to be much larger than that of the cylinder 12. The number of screws in the gas suction/degassing apparatus is not limited to two in particular.

When such a gas suction/degassing apparatus is provided as the degassing portion 31, rotating the screws S2*a* and S2*b* by the rotary drive mechanism 330 prevents backflow of the kneaded material conveyed through the cylinder 12 into the gas suction/degassing apparatus (pushing the kneaded material toward the cylinder 12), and the gas component originating from the kneaded material can be discharged out of the cylinder 12. The gas component originating from the discharged kneaded material is removed from the cylinder 310 through the vent portion 320 to the outside (a dashed arrow in FIG. 5).

Here, instead of the gas suction/degassing apparatus, a vent apparatus can be provided as the degassing portion 31. As the vent apparatus, a vacuum vent apparatus is preferable. The vacuum vent apparatus is an apparatus configured to directly remove the gas component originating from the kneaded material through a vent hole provided in the cylinder 12 by using a vacuum pump.

In the apparatus 30 of manufacturing the resin composite material shown in FIG. 4, an example in which the degassing portion 31 is arranged at two positions that are midstream and downstream of the cylinder 12 is exemplified. However, the number of arrangement positions may be one, three or more if the gas component originating from the kneaded material conveyed through the cylinder 12 can be effectively removed. Also, the arrangement positions can be also appropriately changed depending on the used manufacturing apparatus and manufacturing conditions and others.

The "gas component originating from the kneaded material" assumed in the present embodiment is gas generated mainly by heating of the kneaded material for a relatively long time or the high heating temperature. For example, in the present embodiment which includes the moisture-absorbent filler as the raw material, the gas generated by decomposition of the moisture-absorbent filler being heated to a temperature that is equal to or higher than a roasting temperature is exemplified, and the gas component does not include volatile gas originally contained in the moisture-absorbent filler and evaporated and generated by heating.

<Method of Manufacturing Resin Composite Material>

Next, each step of the method of manufacturing the resin composite material according to the present embodiment will be explained while taking the case of using the apparatus 30 of manufacturing the resin composite material 1 shown in FIG. 4 described above as an example.

The method of manufacturing the resin composite material using the apparatus 30 of manufacturing the resin composite material is performed at the same steps (the step (1*a*) to the step (1*d*)) as those of the operations described in the first embodiment. In the present embodiment, at the step (1*c*) (conveying step), the gas originating from the kneaded material which generated from the kneaded material can be removed from the cylinder 12 through the degassing portion 31 to the outside. Thus, even if gas originating from the kneaded material is generated in the cylinder 12, it is possible to suppress the addition of the gas into the kneaded material, and stably transport the kneaded material. Accordingly, in the resin composite material extruded from the die 14, the required quality can be maintained, and the manufacturing efficiency can be improved.

The third embodiment has been described in the case of adding the degassing portion 31 to the first embodiment. However, the description can be also applied to the second embodiment.

Modification Example

As already explained, the die 14 described in the above embodiment can be used without particular limitation when being a publicly-known die used as the extruder.

In order to extrude the kneaded material containing the water-absorbing filer, it is preferable to convey and extrude the resin composite material described in the present specification so as to prevent its temperature from rising to a decomposing temperature of the water-absorbing filler as much as possible. Since the temperature of the kneaded material may also increase even inside the die (retaining portion) due to the shear force applied, it is preferable to facilitate the extrusion of the kneaded material through the die hole as much as possible. In this case, it is also preferable to make the retaining portion smaller.

Figure 6:
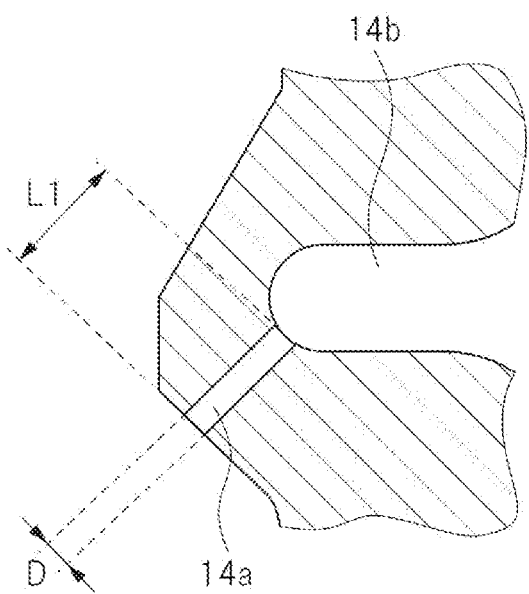
FIG. 6 is a partially enlarged view of a die.

For example, FIG. 6 shows an enlarged view of a die hole 14a (extrusion hole) and a retaining portion 14b connected thereto as an example of the die 14. When it is assumed that a length of the die hole 14a is "L" while a diameter of the same is "D", a ratio (L/D) of the length L to the diameter D which is a parameter of the die hole 14a among the above components is preferably equal to or smaller than 5 in order to facilitate the extrusion of the kneaded material and control the temperature increase of the kneaded material, more preferably equal to or smaller than 4, and even more preferably equal to or smaller than 3. In this relationship, the smaller the value is, the lower the probability of excessive pressure increase inside the retaining portion is, and therefore, the smaller value is preferable because of being capable of facilitating the extrusion from the retaining portion.

In the retaining portion of the die 14, while checking the pressure of the retaining portion and the temperature of the kneaded material, it is also preferable to control the pressure and the temperature so that they do not become excessively high. At this time, the die 14 is provided with a pressure gauge, a thermometer or the like in which a predetermined pressure or temperature is previously set, and monitors whether or not the pressure or temperature exceeds the set value. If this exceeds the set value, it is preferable to arrange a controller that controls the pressure or temperature to stay within the set value. For example, if the pressure or temperature exceeds the predetermined value, the pressure or temperature can be adjusted by feedback control of lowering the heating temperature for the cylinder 12, making the screw rotational speed of the cylinder 12 slow, releasing the gas in the retaining portion to the outside or others.

Note that the decomposition of the moisture-absorbent filler described in the first embodiment, when it happens, causes a risk of the pressure increase in the retaining portion of the die 14, the decrease of the manufacturing efficiency of the resin composite material, or the quality decrease of the resin composite material. For this reason, it is preferable to suppress such decomposition, and it is also preferable to keep the temperature of the kneaded material (moisture-absorbent filler) so as not to exceed its decomposition temperature to manufacture the resin composite material. Here, the temperature of the kneaded material tends to increase at a position where the extrusion molding is performed in the die 14, and the die 14 may be provided with a thermometer in order to control the temperature of the kneaded material so as not to exceed the decomposition temperature.

As described above, some embodiments have been described. The resin composite material obtained in the present embodiment can be molded in accordance with various purposes, and is widely applicable to the manufacturing of, for example, substitutive goods of plastic products such as a tray; automobile parts; interiors such as a dashboard in automobile; airplane luggage compartment; structural members of transportation equipment; household appliance housings (housing); cards; various containers such as toner containers; construction materials; seedling pots; agricultural sheets; writing instruments; substitutive goods of wooden products; household appliances; straws; cups; toys; sports goods; port materials; building components; generator components; industrial tools; fishing gear; packaging materials; 3D printer moldings; pallets; and so on. Such a product is disposed if unnecessary. However, for example, even if such a product is burned and emit the carbon dioxide, if the blended moisture-absorbent filler is made of the natural material, an amount of the disposal can be handled as not increasing the amount of the carbon dioxide in the atmosphere.

EXAMPLES

The method and the apparatus of manufacturing the resin composite material according to the present embodiment will be described in detail below while using examples and comparative examples.

<Moisture-Absorbent Filler>

First, cellulose powder (manufactured by Nippon Paper Industries, Co., Ltd., KC FLOCK W50GK; average particle size of 45 μm) was prepared as the moisture-absorbent filler becoming the raw material.

Example 1

Polypropylene (manufactured by Japan Polypropylene Corporation, trade name: BC10HRF, melt flow rate (MI): 100 g/10 min.) prepared as the resin becoming the raw material and these materials were continuously heated and kneaded while being mixed by using the apparatus 30 of manufacturing the resin composite material shown in FIG. 4 to manufacture the resin composite material.

At this time, the resin composite material was manufactured under a plurality of conditions as shown in Table 1, and the manufacturing state (strand state) of the resin composite material extruded and molded in a strand form in the manufacturing was evaluated based on the following criteria, and the results are also shown in Table 1 (Examples 1-1 to 1-3).

[Evaluation Criteria]

○: This state achieves the manufacturing of the strand-form resin composite material, and achieves the preparation of the pellet using a strand cutter.

Δ: This state achieves the manufacturing of the strand-form resin composite material, but does not achieve the preparation of the pellet using a strand cutter.

x: This state does not achieve the manufacturing of the strand-form resin composite material.

TABLE 1

| | Manufacturing conditions | | | | | |
| | Moisture-absorbent filler concentration [mass %] | Extrusion amount [kg/h] | Screw rotation speed [rpm] | Barrel set temperature [° C.] | Kneaded material temperature [° C.] | Results Strand state |
|---|---|---|---|---|---|---|
| Example 1-1 | 50 | 10.0 | 200 | 150 | 216 | ○ |
| Example 1-2 | 50 | 15.0 | 300 | 150 | 217 | ○ |
| Example 1-3 | 50 | 20.0 | 400 | 150 | 219 | ○ |

Note that the "Kneaded material temperature" in the table is the value obtained by measuring the temperature of the kneaded material immediately before the extrusion by using the thermometer provided on the die 14. Also, as the apparatus 30 of manufacturing the resin composite material, an apparatus including the degassing cylinder 130 shown in FIG. 2 used as the degassing portion, a die with the die hole 14a having L/D of 2.0 used as the die 14, and the gas suction/degassing apparatus shown in FIG. 5 used as the degassing portion 31 that are embedded in the twin-screw kneading extruder (manufactured by The Japan Steel Works, Ltd., trade name: TEX30) was used.

Comparative Example 1

Figure 7:
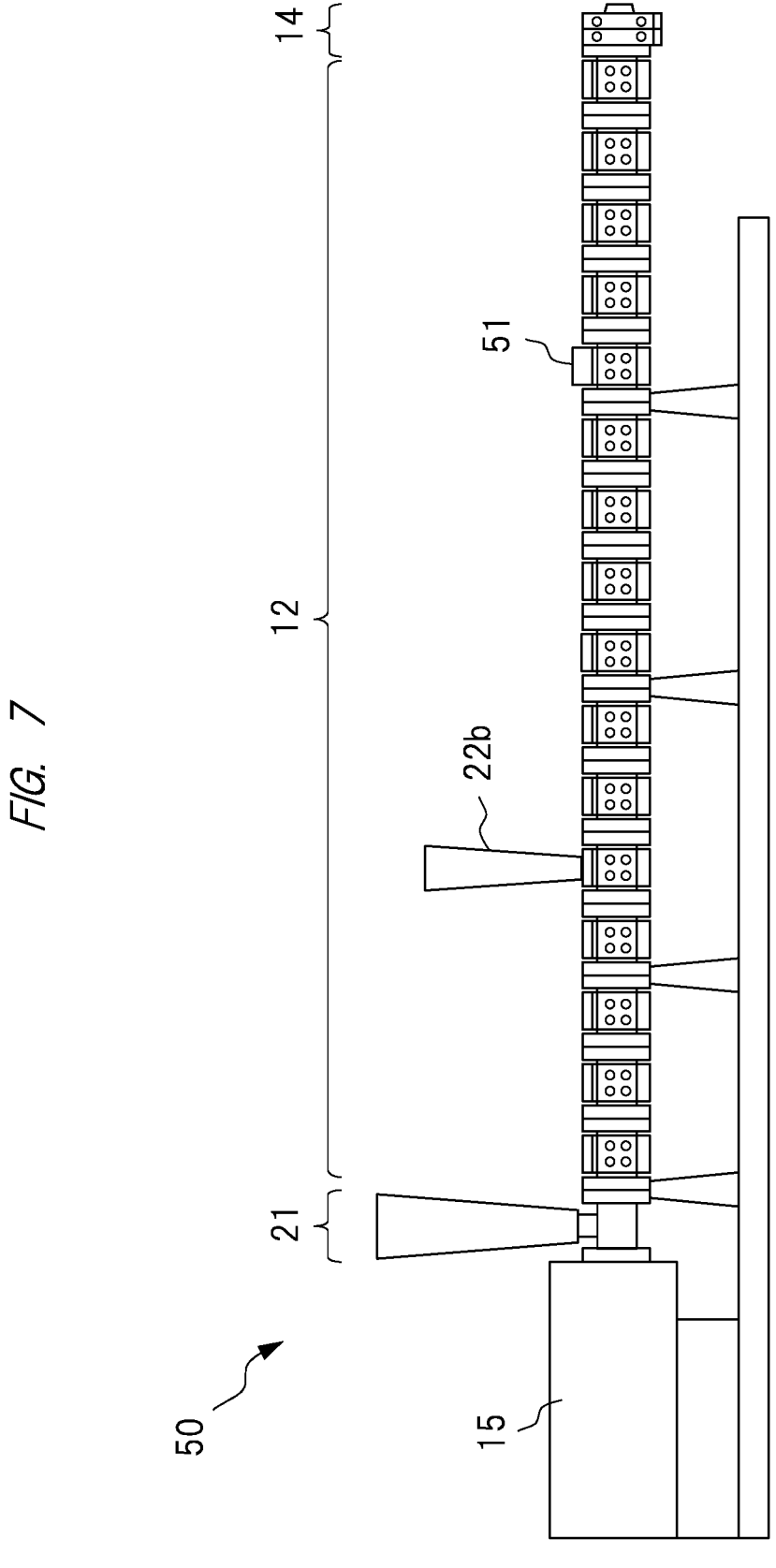
FIG. 7 is a side view showing a configuration of an apparatus of manufacturing a resin composite material used in a comparative example.

Polypropylene (manufactured by Prime Polymer Co., Ltd., trade name: J106G, melt flow rate (MI): 15 g/10 min.) prepared as the resin becoming the raw material and the moisture-absorbent filler that are the raw materials were continuously heated and kneaded while being mixed by using an apparatus 50 of manufacturing the resin composite material shown in FIG. 7 to manufacture the resin composite material.

At this time, the resin composite material was manufactured under a plurality of conditions as shown in Table 2, and the manufacturing state (strand state) of the resin composite material extruded and molded in a strand form in the manufacturing was evaluated, and the results are also shown in Table 2 (Comparative Examples 1-1 to 1-3).

Note that the apparatus 50 of manufacturing the resin composite material used here includes the resin supply portion 21, the moisture-absorbent filler supply portion 22 (the side-feeding supply apparatus shown in FIG. 3A and FIG. 3B), the cylinder 12, the die 14, the rotary drive mechanism 15, and a degassing port 51. This apparatus has a configuration similar to that of the apparatus of manufacturing the resin composite material described in the second embodiment, but is different therefrom in that this apparatus does not include the degassing portion (the degassing portion corresponding to the degassing portion 23 in FIG. 3A and FIG. 3B) but includes the degassing port 51 at the downstream of the cylinder 12 while using a die with the die hole 14a having L/D of 4.5 as the die 14. However, this apparatus is a manufacturing apparatus having the same configuration other than these configurations. Note that the degassing port 51 is connected to a vacuum pump.

TABLE 2

| | Manufacturing conditions | | | | | |
| --- | --- | --- | --- | --- | --- | --- |
| | Moisture-absorbent filler concentration [mass %] | Extrusion amount [kg/h] | Screw rotation speed [rpm] | Barrel set temperature [° C.] | Kneaded material temperature [° C.] | Results Strand state |
| Comparative example 1-1 | 10 | 5.0 | 150 | 180 | 203 | X |
| Comparative example 1-2 | 30 | 5.0 | 150 | 180 | 210 | X |
| Comparative example 1-3 | 50 | 5.0 | 150 | 180 | — | — |

The evaluation criteria for the manufacturing state (strand state) of the resin composite material are the same as above. In the Comparative Example 1-3, a feed neck occurred, and the supply of the raw materials was not achieved, and therefore, the items "Kneaded material temperature" and "Strand state" were evaluated as "-".

From the above results, in the Example 1, the raw material supply amount was stable without the adhesion of the water-absorbing filler to the shooter of the raw-material supply portion and the formation of the plug at the feed port of the extruder. In addition, since the above-described problems were eliminated, the stable extrusion molding was achieved even when the raw material supply amount was increased, and the efficient manufacturing of the resin composite material was also possible. The resultant strand state was also good.

On the other hand, in the Comparative Example 1, the adhesion of the moisture-absorbent filler to the shooter of the raw-material supply portion and the formation of the lump at the feed port of the raw-material supply portion were observed, and therefore, the raw material supply amount was unstable, and the stable extrusion molding was not possible. For this reason, the increase of the raw-material supply amount could not even be evaluated. Also, the stranding state was not good, either, due to this unstable raw-material supply amount.

EXPLANATION OF REFERENCE CHARACTERS

10, 20, 30 . . . Apparatus of manufacturing a resin composite material
11 . . . Raw-material supply portion
11a, 21a, 22b . . . Shooter
12 . . . Cylinder
13, 23, 31 . . . Degassing portion
14 . . . Die
15 . . . Rotary drive mechanism
21 . . . Resin supply portion
22 . . . Moisture-absorbent filler supply portion

The invention claimed is:

1. A method of manufacturing a resin composite material, comprising steps of:

(1a) supplying a thermoplastic resin and a moisture-absorbent filler from a raw-material supply portion to a first cylinder;

(1b) melting and plasticizing the thermoplastic resin and kneading the moisture-absorbent filler and the thermoplastic resin melted and plasticized in the first cylinder;

(1c) conveying a kneaded material obtained by the kneading through the first cylinder; and (1d) extruding the conveyed kneaded material from a die provided in the first cylinder to manufacture a composite material of the moisture-absorbent filler/the thermoplastic resin, wherein, in the step (1b), volatile gas generated from the kneaded material is degassed from a first degassing portion to outside, wherein the volatile gas is water vapor that is vaporized by heating moisture contained in the moisture-absorbent filler, and wherein a "gas component originating from the kneaded material" generated by decomposition of the moisture-absorbent filler when heated to a temperature equal to or higher than a roasting temperature is degassed to the outside through a second degassing portion different from the first degassing portion.

2. The method of manufacturing the resin composite material according to claim 1, wherein the first degassing portion is provided at a connection part of the first cylinder with the raw-material supply portion.

3. A method of manufacturing a resin composite material, comprising steps of:

(2a) supplying a thermoplastic resin from a resin supply portion to a first cylinder;

(2b) melting and plasticizing the thermoplastic resin;

(2c) supplying a moisture-absorbent filler from a moisture-absorbent filler supply portion into the first cylinder, and kneading the moisture-absorbent filler with the thermoplastic resin melted and plasticized;

(2d) conveying a kneaded material obtained by the kneading through the first cylinder; and (2e) extruding the conveyed kneaded material from a die provided in the first cylinder to manufacture a composite material of the moisture-absorbent filler/the thermoplastic resin, wherein, in step (2c), volatile gas generated from the kneaded material is degassed to outside from a first degassing portion provided at a connection part of the moisture-absorbent filler supply portion with the first cylinder, wherein the volatile gas is water vapor that is vaporized by heating moisture contained in the moisture-absorbent filler, and wherein a "gas component originating from the kneaded material" generated by decomposition of the moisture-absorbent filler when heated to a temperature equal to or higher than a roasting temperature is degassed to the outside through a second degassing portion different from the first degassing portion.

4. The method of manufacturing the resin composite material according to claim 1, wherein degassing of the volatile gas in the step (1b) is performed by suction.

5. The method of manufacturing the resin composite material according to claim 1, wherein the second degassing portion is composed of a vent apparatus including a second cylinder connected to a side surface of the first cylinder, and wherein the vent apparatus degasses the "gas component originating from the kneaded material" while extruding the kneaded material toward the first cylinder.

6. The method of manufacturing the resin composite material according to claim 5, wherein the "gas component originating from the kneaded material" is degassed while being sucked by the vent apparatus.

7. The method of manufacturing the resin composite material according to claim 1, wherein a temperature of the kneaded material is controlled so as not to exceed a decomposition temperature of the moisture-absorbent filler.

8. The method of manufacturing the resin composite material according to claim 1, wherein, in the die, a ratio (L/D) of a length L to a diameter D of a die hole through which the kneaded material is extruded is equal to or smaller than 5.

* * * * *